Jan. 31, 1950     A. E. DENTLER     2,495,921
FRICTION SHOCK ABSORBER
Filed Aug. 25, 1945
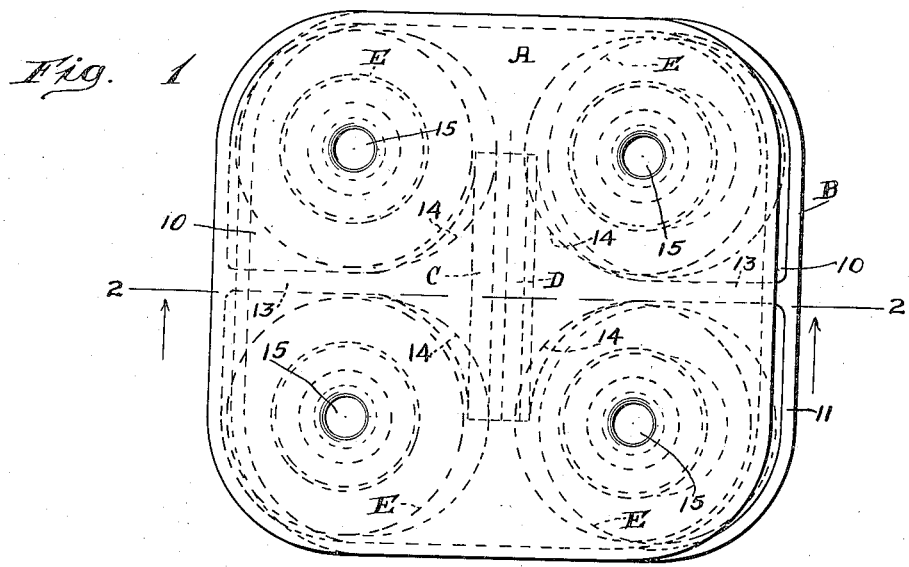
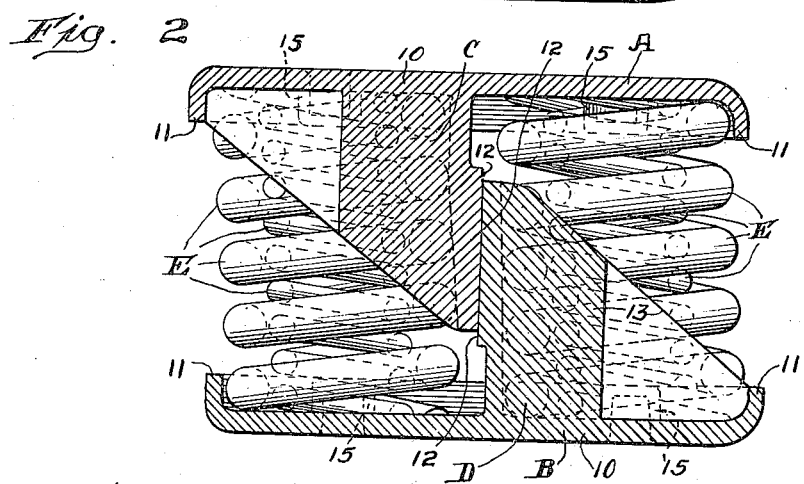
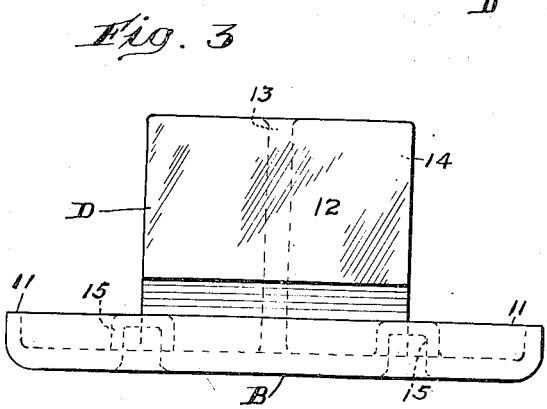
Inventor:
Arnold E. Dentler.
By Henry Fuchs.
Attys.

Patented Jan. 31, 1950

2,495,921

UNITED STATES PATENT OFFICE 2,495,921

FRICTION SHOCK ABSORBER

Arnold E. Dentler, La Grange, Ill., assignor to W. H. Miner, Inc., Chicago, Ill., a corporation of Delaware Application August 25, 1945, Serial No. 612,672

2 Claims. (Cl. 267—9)

This invention relates to improvements in friction shock absorbers.

One object of the invention is to provide a friction shock absorber comprising relatively movable follower members having friction post portions in sliding engagement with each other, and a plurality of helical coil spring units resisting relative movement of said members toward each other, wherein the springs are placed with their longitudinal central axes slightly inclined to the vertical, whereby the tendency of the spring units to assume the true vertical position forces the relatively movable members in laterally opposite directions to press the friction posts thereof into tight frictional contact with each other, thus snubbing the action of the springs.

Other objects of the invention will more clearly appear from the description and claims hereinafter following.

In the drawing forming a part of this specification, Figure 1 is a top plan view of my improved shock absorber. Figure 2 is a vertical sectional view, corresponding substantially to the line 2—2 of Figure 1. Figure 3 is a side elevational view of one of the friction members of my improved mechanism, the member illustrated being the lower one as shown in Figure 2, looking from left to right in said figure.

As shown in the drawing, my improved shock absorber comprises broadly a pair of top and bottom, relatively movable members A and B having friction posts C and D formed integral therewith, and four spring units E—E—E—E interposed between the members A and B.

The friction members A and B are of similar design, but reversely arranged, that is, the member A is inverted with respect to the member B. Each member A and B is provided with a relatively thick, platelike follower section 10 of broadly rectangular outline. Each platelike follower section 10 has a continuous flange 11 along the edge thereof, the flange of the member A depending therefrom and that of the member B upstanding.

The friction posts C and D are formed integral with the follower plate sections 10—10 of the members A and B, respectively, and are at opposite sides of the vertical center of the device, that is, at opposite sides of a central, transverse vertical plane, the post C depending from the plate 10 of the member A and the post D upstanding from the plate 10 of the member B. Each post C and D has a vertically disposed, transversely extending, flat friction surface 12 on the inner side thereof engaging the friction surface 12 on the inner side of the other post. At the outer side, each post C and D presents an upstanding web 13 having concave spring guide faces 14—14 at opposite sides thereof adapted to engage between the corresponding spring units E—E of the group of four springs. The friction surfaces 12—12 of the posts C and D are in contact with each other and maintain the platelike follower sections 10—10 of the members A and B in laterally offset position with respect to each other, as clearly shown in Figure 2, the upper member A being offset to the left with respect to the member B, as shown in this figure.

The spring units E are four in number, two units E—E being at one side of the posts and the remaining two units at the opposite side. The units of each pair E—E are held in position by the cooperating guide webs of the posts, which guide webs engage between the spring units.

Each spring unit comprises a relatively heavy outer coil and a lighter inner coil. Centering bosses 15—15—15—15 for the spring units E—E—E—E are preferably provided on the platelike followers 10—10 of the members A and B and engage within the top and bottom ends of the inner coils of the spring units. The parts are so designed that the spring units E have their vertical central axes slightly inclined to the vertical, that is, they are slightly canted, and the tendency of the spring units to assume a true vertical position while being compressed urges the members A and B in opposite directions horizontally, thereby pressing the friction surfaces of the posts into tight frictional engagement with each other.

My improved friction shock absorber when used to yieldingly support the body of a car is interposed between the usual truck bolster and spring plank of the car, the plate sections 10—10 of the members A and B functioning in the manner of the usual spring plates of a spring cluster and engaging respectively the underneath side of the truck bolster and the top side of the spring plank.

The operation of my improved friction shock absorber is as follows: Upon relative approach of the members A and B, due to compression of the shock absorber between two relatively movable members, such as the truck bolster and spring plank of a car, the springs E—E—E—E sustain the load and are compressed to absorb the shock, and frictional resistance is created between the posts, which slide on each other, the latter being forced into tight frictional contact, due to the forcible action of the springs E—E—E—E, which have a tendency to assume a true vertical position. The action of the springs E—E—E—E is thus effectively dampened or snubbed and such dampening or snubbing action is produced in both compression and recoil of the spring units.

Although my improved shock absorber has been hereinbefore described as applied to railway car trucks, it will be evident to those skilled in this art that the same may be employed equally well in connection with railway draft riggings to absorb the usual buff and draft shocks, and many other devices.

I claim:

1. In a friction shock absorber, the combination with a pair of relatively lengthwise slidable friction posts; of coil springs at opposite sides of said posts; follower sections on said posts bearing on opposite ends of said coil springs; and spring seats on said follower sections respectively for holding said coil springs in tilted position with their central longitudinal axes inclined to the central longitudinal axis of the mechanism to force said posts laterally toward each other.

2. In a friction shock absorber, the combination with an upper friction post having an upper follower plate integral therewith and spring seats on said follower plate; of a lower friction post having a lower follower plate integral therewith and spring seats on said follower plate, said post and spring seats of said upper follower plate being laterally offset in the same direction with respect to the post and spring seats of said lower follower plate; and spring units at opposite sides of said posts bearing at their top and bottom ends on said upper and lower follower plates and engaged by said spring seats of said follower plates respectively to hold said units in tilted position with the longitudinal central axes thereof inclined with respect to the longitudinal central axis of the mechanism.

ARNOLD E. DENTLER.

REFERENCES CITED

The following references are of record in the file of this patent:

UNITED STATES PATENTS

| Number | Name | Date |
|---|---|---|
| 709,999 | McCord | Sept. 30, 1902 |
| 1,884,520 | Barrows | Oct. 25, 1932 |
| 2,238,227 | Lounsbury | Apr. 15, 1941 |
| 2,410,160 | Haseltine | Oct. 29, 1946 |
| 2,410,165 | Johnson et al. | Oct. 29, 1946 |